(12) United States Patent  (10) Patent No.: US 8,387,257 B2
Salter et al.  (45) Date of Patent: Mar. 5, 2013

(54) VEHICLE INTERIOR PANEL AND METHOD TO MANUFACTURE

(75) Inventors: Stuart C. Salter, White Lake, MI (US); Chi Li, Farmington Hills, MI (US); Jeffrey Singer, Canton, MI (US); Denis Patrick Igoe, Livonia, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 370 days.

(21) Appl. No.: 12/873,517

(22) Filed: Sep. 1, 2010

(65) Prior Publication Data

US 2012/0051073 A1   Mar. 1, 2012

(51) Int. Cl.
   *B21D 53/88* (2006.01)
(52) U.S. Cl. .......................... 29/897.2; 29/464; 362/490
(58) Field of Classification Search .................. 29/897.2, 29/464, 460; 362/487, 488, 489, 490, 492, 362/493
See application file for complete search history.

(56) References Cited

U.S. PATENT DOCUMENTS

| | | | |
|---|---|---|---|
| 4,794,373 A | 12/1988 | Harrison | |
| 4,840,832 A * | 6/1989 | Weinle et al. | 428/156 |
| 4,864,473 A | 9/1989 | Tokarz et al. | |
| 4,923,542 A | 5/1990 | Janicki et al. | |
| 5,136,485 A | 8/1992 | Muller | |
| 5,215,811 A | 6/1993 | Reafler et al. | |
| 5,239,449 A | 8/1993 | Wnuk et al. | |
| 5,411,688 A | 5/1995 | Morrison et al. | |
| 5,508,509 A | 4/1996 | Yafuso et al. | |
| 5,681,515 A | 10/1997 | Pratt et al. | |
| 5,699,438 A | 12/1997 | Smith et al. | |
| 5,754,664 A | 5/1998 | Clark et al. | |
| 5,758,947 A | 6/1998 | Glatt | |
| 5,824,251 A | 10/1998 | Morrison et al. | |
| 6,010,742 A | 1/2000 | Tanabe et al. | |
| 6,120,091 A | 9/2000 | Reich et al. | |
| 6,464,381 B2 | 10/2002 | Anderson, Jr. et al. | |
| 6,555,042 B1 | 4/2003 | Mola et al. | |
| 6,607,413 B2 | 8/2003 | Stevenson et al. | |
| 6,623,069 B2 | 9/2003 | Grimm | |
| 6,652,128 B2 | 11/2003 | Misaras | |
| 6,773,129 B2 | 8/2004 | Anderson, Jr. et al. | |
| 6,959,956 B1 | 11/2005 | Fero et al. | |
| 6,974,238 B2 | 12/2005 | Sturt et al. | |
| 7,121,702 B2 | 10/2006 | Müller | |
| 7,234,850 B2 | 6/2007 | Garcia et al. | |
| 7,255,622 B2 | 8/2007 | Stevenson et al. | |
| 7,309,521 B2 | 12/2007 | Brown | |
| 7,607,807 B2 | 10/2009 | Hall | |

(Continued)

FOREIGN PATENT DOCUMENTS

JP   2006007764   1/2006

*Primary Examiner* — David Bryant
*Assistant Examiner* — Ryan J Walters
(74) *Attorney, Agent, or Firm* — Vichit Chea; Price Heneveld LLP (57) ABSTRACT

A vehicle interior panel is provided that includes an interior panel substrate defining an aperture for a light source to extend through the interior panel substrate, a lens attached to the interior panel substrate, wherein the lens extends over at least a portion of the aperture for the light source, an at least partially transparent material that extends over the lens, and a plurality of positioning holes defined by the interior panel substrate, such that at least a portion of the plurality of positioning holes are configured to correspond to a plurality of positioning pins of an interior panel mold.

12 Claims, 6 Drawing Sheets

U.S. PATENT DOCUMENTS

| | | |
|---|---|---|
| 8,162,519 B2 * | 4/2012 | Salter et al. .................. 362/488 |
| 2001/0012369 A1 | 8/2001 | Marquiss |
| 2004/0017687 A1 | 1/2004 | Misaras |
| 2004/0197547 A1 | 10/2004 | Bristow et al. |
| 2006/0208378 A1 | 9/2006 | Khambete et al. |
| 2007/0047246 A1 | 3/2007 | Barowski et al. |
| 2007/0153535 A1 | 7/2007 | Bostick |
| 2007/0160334 A1 | 7/2007 | Cobb et al. |
| 2007/0226994 A1 | 10/2007 | Wollach et al. |
| 2010/0212819 A1 | 8/2010 | Salter et al. |
| 2010/0214795 A1 | 8/2010 | Salter et al. |
| 2010/0214798 A1 * | 8/2010 | Salter et al. .................. 362/520 |
| 2011/0157906 A1 | 6/2011 | Oeuvrard et al. |

* cited by examiner

VEHICLE INTERIOR PANEL AND METHOD TO MANUFACTURE

FIELD OF THE INVENTION

The present invention generally relates to a vehicle interior panel and method to manufacture, and more particularly, a vehicle headliner and hidden dome lamp and method to manufacture

BACKGROUND OF THE INVENTION

Lamps are generally disposed about a vehicle interior to provide light inside the automobile. Generally, lamps extend through a headliner to illuminate a cabin of the vehicle. Thus, lamps are typically designed to minimize attenuation of the light emitted from the lamp.

SUMMARY OF THE INVENTION

Accordingly, in a first disclosed embodiment, a vehicle interior panel is provided that includes an interior panel substrate defining an aperture for a light source to extend through the interior panel substrate, a lens attached to the interior panel substrate, wherein the lens extends over at least a portion of the aperture for the light source, an at least partially transparent material that extends over the lens, and a plurality of positioning holes defined by the interior panel substrate, such that at least a portion of the plurality of positioning holes are configured to correspond to a plurality of positioning pins of an interior panel mold.

In another disclosed embodiment, a method of manufacturing a vehicle interior panel including the steps of providing a plurality of positioning pins on an interior panel mold, cutting an interior panel substrate to define a plurality of positioning holes, cutting the interior panel substrate to define an aperture for a light source to extend through the interior panel substrate, attaching a lens to the interior panel substrate, wherein the lens extends over at least a portion of the aperture for the light source, and placing the interior panel substrate in the interior panel mold, such that at least a portion of the plurality of positioning holes correspond to the plurality of positioning pins.

In another disclosed embodiment, a method of manufacturing an interior panel having a hidden dome lamp is provided that includes cutting positioning holes in a substrate, cutting an aperture for a light source in the substrate, attaching a lens that extends over the aperture, placing the substrate in a mold including positioning pins that correspond with the positioning holes, molding a headliner, and attaching a transparent headliner fabric over the lens.

These and other aspects, objects, and features of the present invention will be understood and appreciated by those skilled in the art upon studying the following specification, claims, and appended drawings.

DETAILED DESCRIPTION OF PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

With respect to FIGS. 1-5, a vehicle is generally shown at reference identifier 100 having an interior light generally indicated at reference identifier 102. The interior light 102 can include a circuit board 104 configured to attach to an interior panel substrate 114 of the vehicle 100, and an at least partially transparent material 108 proximate the circuit board 104 and attached to the interior panel substrate 114. The interior light 102 can further include at least one light source 110 electrically connected to the circuit board 104, such that the at least one light source 110 is between the circuit board 104 and the at least partially transparent material 108, wherein the at least one light source 110 can be configured to emit light that propagates through the at least partially transparent material 108.

A vehicle interior panel generally indicated at reference identifier 112 can include the interior panel substrate 114 and defining an aperture 116 for the light source 110 to extend through the interior panel substrate 114. Additionally, the vehicle interior panel 112 can include a lens 118 attached to the interior panel substrate 114, wherein the lens 118 extends over at least a portion of the aperture 116 for the light source 110. The at least partially transparent material 108 can extend over the lens 118, and a plurality of positioning holes 120 defined by the interior panel substrate 114, such that at least a portion of the plurality of positioning holes 120 are configured to correspond to a plurality of positioning pins 122 (FIG. 6) of an interior panel mold generally indicated at reference identifier 124 (FIG. 6), as described in greater detail herein.

The vehicle interior panel 112 can be attached to a roof support structure 106, according to one embodiment. The roof support structure 106 can be, but is not limited to, structural beams that form a part of the vehicle's 100 frame, a structural headliner, the like, or a combination thereof.

By way of explanation and not limitation, the positioning holes 120 can be precut into the interior panel substrate 114, and can be cut at the same time as the aperture 116 for the light source 110. Further, the lens 118 can be pre-attached into the aperture 116 before molding, and thus, consolidating the cutting process and the gluing process to eliminate manufacturing steps.

According to one embodiment, the interior panel substrate 114 can be a headliner substrate, the at least partially transparent material 108 can be a headliner fabric, and/or the light source 110 can be one or more light emitting diodes (LEDs). Thus, the light source 110 can include one or more light elements, or a plurality of light sources 110 can include one or more light elements. In such an embodiment, the interior light 102 can be a hidden dome lamp. Positioning of the light source 110 between the circuit board 104 and the at least partially transparent material 108 allows for the light emitted by the light source 110 to be propagated through the at least partially transparent material 108 to illuminate the vehicle 100 cabin. Thus, the light emitted from the light source 110 can be viewed through the at least partially transparent material 108 when the light source 110 is ON, and when the light source 110 is OFF, the at least partially transparent material 108 appears as a continuous piece of material with no objects (e.g., a dome lamp) extending there-through. Exemplary hidden dome lamps are described in U.S. patent application Ser. No. 12/390,495, entitled "CONCEALED INTERIOR LIGHTING FOR AUTOMOBILES," U.S. patent application Ser. No. 12/577,294, entitled "HIDDEN LAMP MANUFACTURE PROCESS," and U.S. patent application Ser. No. 12/858,486, (unofficial) entitled "VEHICLE INTERIOR LIGHT CONFIGURED TO COLOR CORRECT AND METHOD THEREOF," the entire disclosures of which are hereby incorporated herein by reference.

Put another way, the light source 110 can be a hidden dome lamp since the light source 110 does not protrude through the at least partially transparent material 108, thereby creating an aesthetic and seamless viewing surface. It is conceived that the vehicle interior panel 112 can be a headliner, door trim, any variety of other panels, or a combination hereof. The at least partially transparent material 108 may be constructed of any of a variety of suitable materials, such as, but not limited to, a film or fabric. Since the light source 110 is hidden, it may be readily observable from the interior portion of the vehicle 100 when not in use.

The interior panel substrate 114 can further define an indicator light hole 126. Similar to the aperture 116 and the positioning holes 120, the indicator light hole can be precut into the interior panel substrate 114, and be cut at the same time as the aperture 116 and the positioning holes 120. The indicator light hole 126 can be configured for an indicator light source 128 to extend through the interior panel substrate 114. The indicator light source 128 can be offset from the light source 110, or in an embodiment that includes a plurality of light sources 110, the indicator light source 128 can be within an array of the plurality of light sources 110. Typically, the indicator light source 128 can be a low intensity LED (e.g., a low current density LED) with respect to the light source 110. In such an embodiment, the indicator light source 128 emits light through the at least partially transparent material 108 to identify a location of the light source 110, a switch 129 for activating de-activating the light source 110, or a combination thereof behind the at least partially transparent material 108 to a user or occupant of the vehicle 100.

Figure 1:
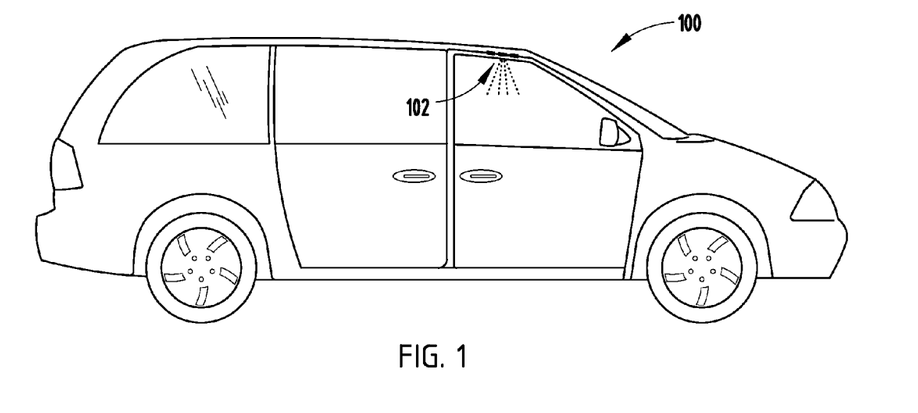
FIG. 1 is a plan view of a vehicle having an interior panel that includes an interior light, in accordance with one embodiment of the present invention.
Figure 2:
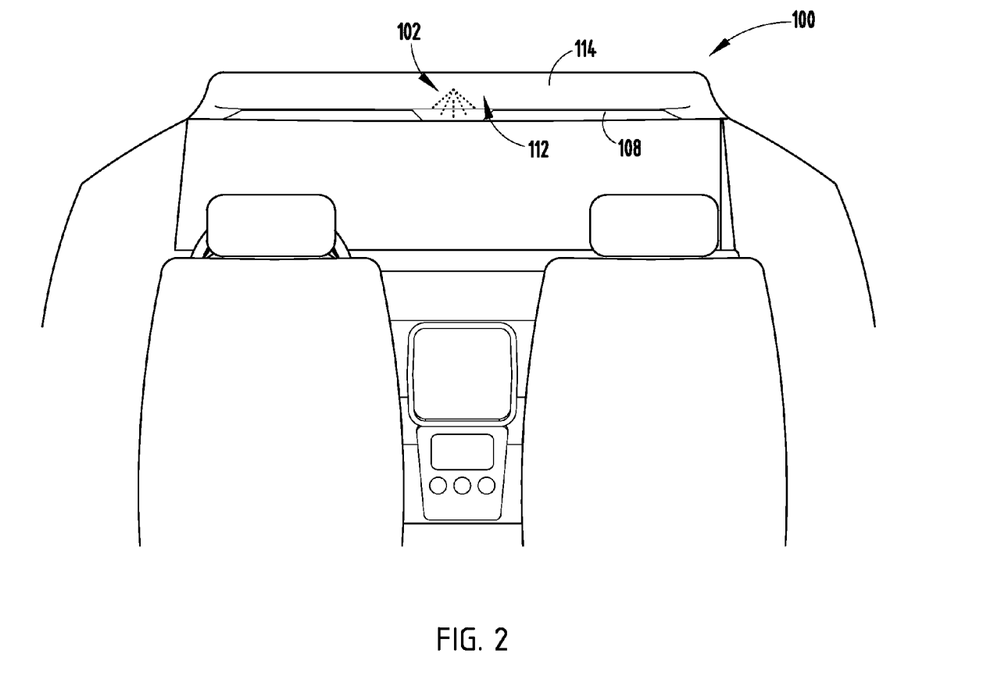
FIG. 2 is a perspective view of an interior cabin of a vehicle having an interior panel that includes an interior light, in accordance with one embodiment of the present invention.
Figure 3:
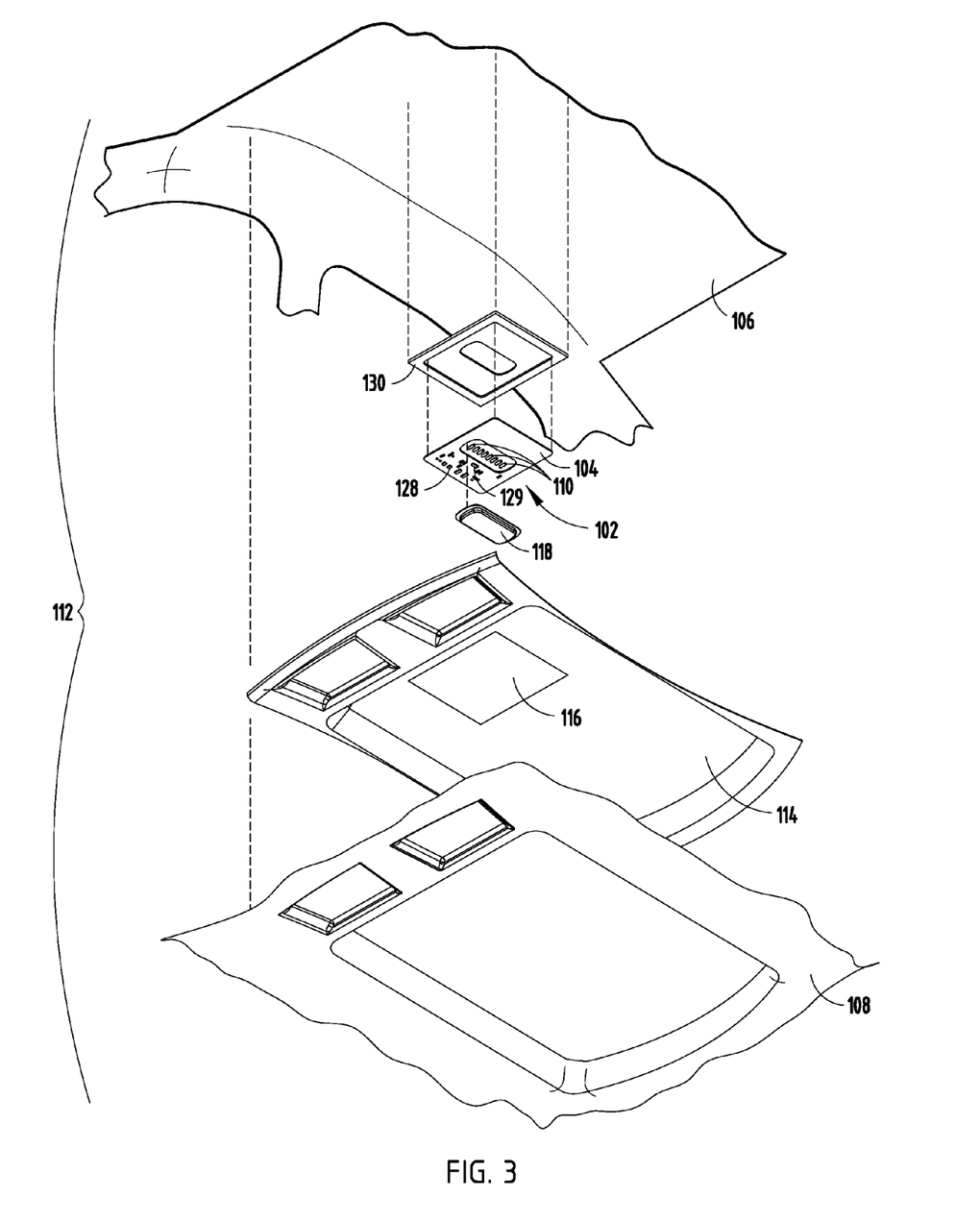
FIG. 3 is an exploded perspective view of an interior panel that includes an interior light, in accordance with one embodiment of the present invention.
Figure 4:
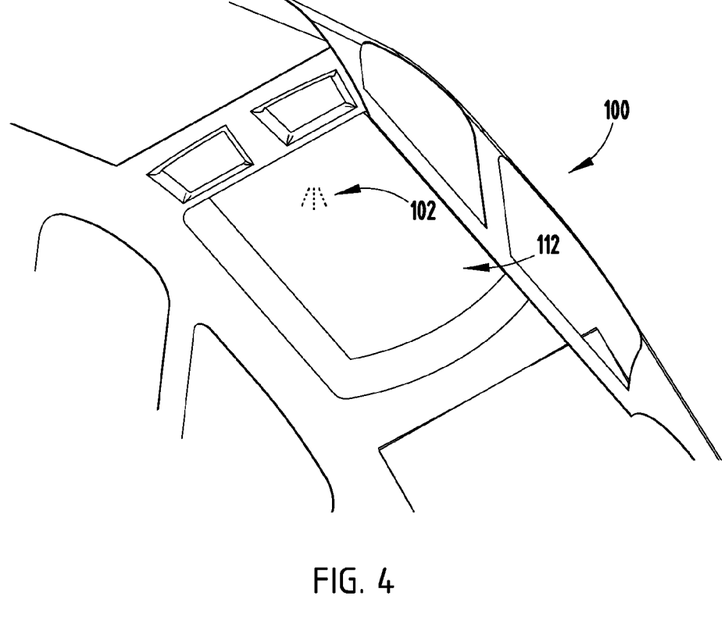
FIG. 4 is a perspective view of an interior cabin of a vehicle having an interior panel that includes an interior light, in accordance with one embodiment of the present invention.
Figure 5:
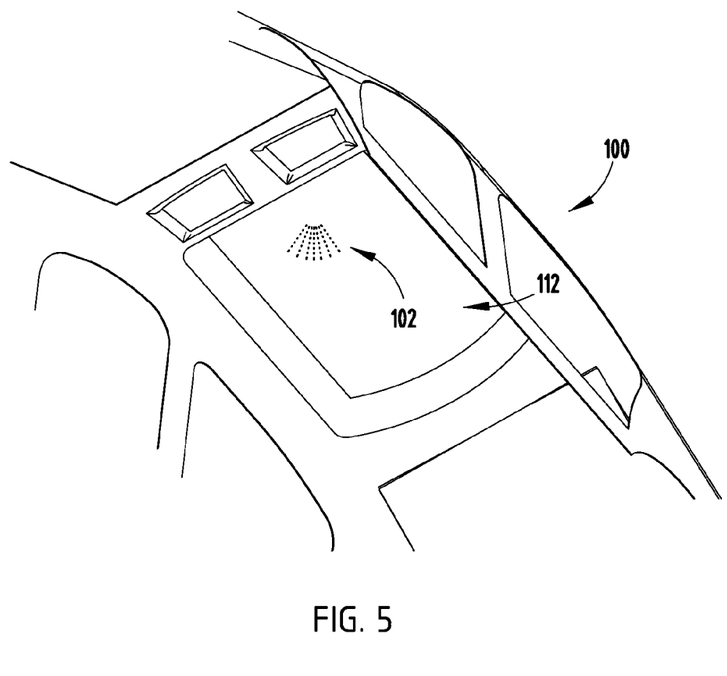
FIG. 5 is a perspective view of an interior cabin of a vehicle having an interior panel that includes an interior light, in accordance with one embodiment of the present invention.
Figure 6:
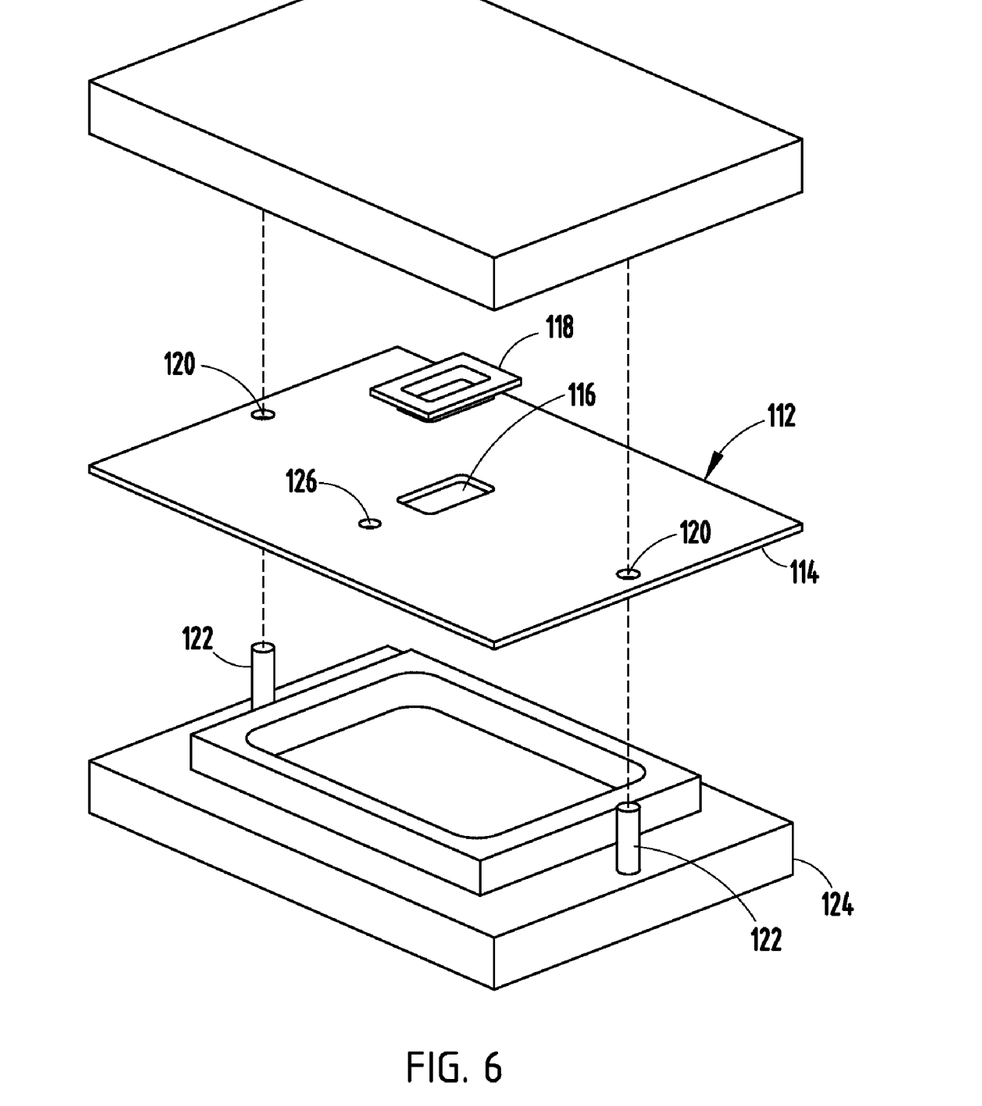
FIG. 6 is an exploded perspective view of a molding assembling, in accordance with one embodiment of the present invention.

As to FIG. 6, at least a portion of the positioning holes correspond to the positioning pins 122. Typically, by having a plurality of positioning pins 122 corresponding with and extending through the plurality of positioning holes 120, within an adequate tolerance (e.g., the positioning holes 120 are slightly larger in diameter than the positioning pins), the interior panel substrate 114 is adequately aligned within the interior panel mold 124. Further, because of the proper alignment, the lens 118 can be attached to the interior panel substrate 114 prior to molding the interior panel 112 (illustrated in FIG. 6 prior to molding). Additionally, since the at least partially transparent material 108 extends over the interior panel substrate 114, the positioning holes 120 are not seen by an occupant of the vehicle 100.

The vehicle interior panel 112 can further include a framing structure 130 attached to the interior panel substrate 114. The framing structure 130 may be constructed of any of a variety of suitable materials, such as, but not limited to, wood, plastic, metal, the like, or a combination thereof. The circuit board 104 can then be attached to the framing structure 130, and the light source 110 can be attached to the circuit board 104, wherein the light source 110 can be configured to emit light that propagates through the lens 118 and the at least partially transparent material 108. Thus, the vehicle interior panel 112 can include the interior light 102 being a hidden dome lamp. The lens 118 can include one or more diffusers and/or the diffuser can be a separate element, wherein the one or more diffusers can be configured to control an illumination pattern of the light emitted by the light source 110. The roof support structure 106 can be the uppermost member, and can typically be constructed of a strong material, such as, but not limited to, metal, to protect the interior of the vehicle 100, according to one embodiment. The interior panel substrate 114 can be made of plastic and disposed below the roof support structure 106. The interior panel substrate 114 can include the aperture 116 adapted to receive the light source 110 during installation. The interior panel substrate 114 and lens 118 can be configured to allow for a flush fit, such that the at least partially transparent material 108 can extend evenly over the interior panel substrate 114 and the lens 118.

According to one embodiment, the at least partially transparent material 108 is adequately translucent and the light source 110 emits light at an adequate intensity so that light emitted from the light source 110 can propagate through the at least partially transparent material 108 to suitably illuminate at least a portion of the vehicle's 100 interior cabin, but at least partially opaque so an occupant of the vehicle 100 does not see the light source 110 through the at least partially transparent material when the light source 110 is OFF. The at least partially transparent material 108 can have approximately six percent (6%) transmission (i.e., the amount of light that passes there-through), and/or can be an off-white foamless fabric. The transmission of the at least partially transparent material 108 can be lower, such as, but not limited to, when a black foam is used. Alternatively, the transmission can be greater, such as, but not limited to, approximately fifty percent (50%) transmission.

For purposes of explanation and not limitation, the lens 118 can be attached to the interior panel substrate 114 using an adhesive. Typically, the adhesive is optically transparent, is heated during the molding process to attach to the at least partially transparent material 108, or a combination thereof. By attaching the lens 118 to the interior panel substrate 114 using an adhesive before molding can improve finished product aesthetics when compared to if the lens 118 is connected to the interior panel substrate 114 in a secondary operation. It should be appreciated by those skilled in the art that the lens 118 can be attached to the interior panel substrate 114 using other suitable attachment devices or materials.

With continued reference to FIGS. 1-6, the vehicle interior panel 112 includes attaching the at least partially transparent material 108 to the interior panel substrate 114, according to one embodiment. The aperture 116 and the positioning holes 120 can be cut, and the lens 118 attached to the interior panel substrate 114 to extend over at least a portion of the aperture 116. The interior panel substrate 114 can be placed into the interior panel mold 124 to be molded with the at least partially transparent material 108, wherein the interior panel substrate 114 is aligned in the interior panel mold 124 utilizing at least a portion of the positioning holes 120.

According to one embodiment, the switch 129 can be one or more touch or proximity switches. By way of explanation and not limitation, the touch or proximity switches can be a capacitive switch, a resistive switch, an inductive switch, an optical switch, a thermal switch, the like, or a combination thereof. Typically, the switch 129 can be activated without contacting the at least partially transparent material 108 (e.g., by altering an electric field of the switch 129). However, it should be appreciated by those skilled in the art that the switch 129 can be a touch switch that is at least partially covered or not covered by the at least partially transparent material 108.

The lens 118 can have one or more optical properties that affect the emitted light propagating there-through, according to one embodiment. For purposes of explanation and not limitation, the lens 118 can alter an illumination pattern of the light emitted from the light source 110, alter a perceived color of the emitted light, alter an intensity of the emitted light, the like, or a combination thereof. The lens 118 can include one or more diffusers and/or the diffuser can be a separate element, wherein the one or more diffusers can be configured to control an illumination pattern of the light emitted by the light source 110.

Figure 9:
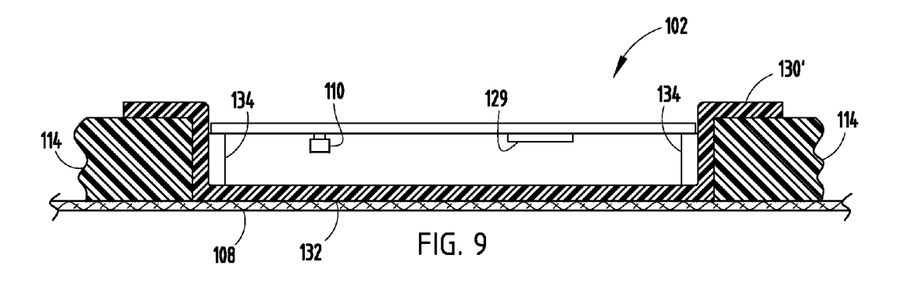
FIG. 9 is a partial cross-sectional view of an interior panel, in accordance with one embodiment of the present invention.

According to one embodiment, as illustrated in FIG. 9, the vehicle interior panel 112 can include the circuit board 104, the at least partially transparent material 108, the at least one light source 110, the interior panel substrate 114, the switch 129, and a framing structure 130'. The framing structure 130' can be a transparent material, such that a surface 132 optically connected to the at least partially transparent material 108 has optical characteristics similar to the lens 118, as described herein. In other words, the lens 118 (e.g., the framing structure 130') can extend over the entire circuit board 104. The framing structure 130' can further include at least one rib 134, wherein the circuit board 104 can be connected to or in contact with the rib 134. Typically, the circuit board 104 is adhesively connected to the rib 134.

In such an embodiment, the circuit board 104, and thus the light source 110 and the switch 129 can be spaced from the surface 132. The light source 110 being spaced from the surface 132 allows for the light to be dispersed prior to passing through the surface 132 and the at least partially transparent material 108, which can allow for more effective optical blending than if the light source 110 were in contact or close proximity to the surface 132. By way of explanation and not limitation, the circuit board 104 can be spaced approximately eight millimeters (8 mm) from the surface 132, the surface 132 can have a thickness of approximately two millimeters (2 mm), or a combination thereof. Additionally or alternatively, at least a portion of the rib 134 can contain an opaque material (e.g., a black coating) so that the emitted light does not pass through the rib 134, which can result in a sharper illumination pattern.

Figure 7:
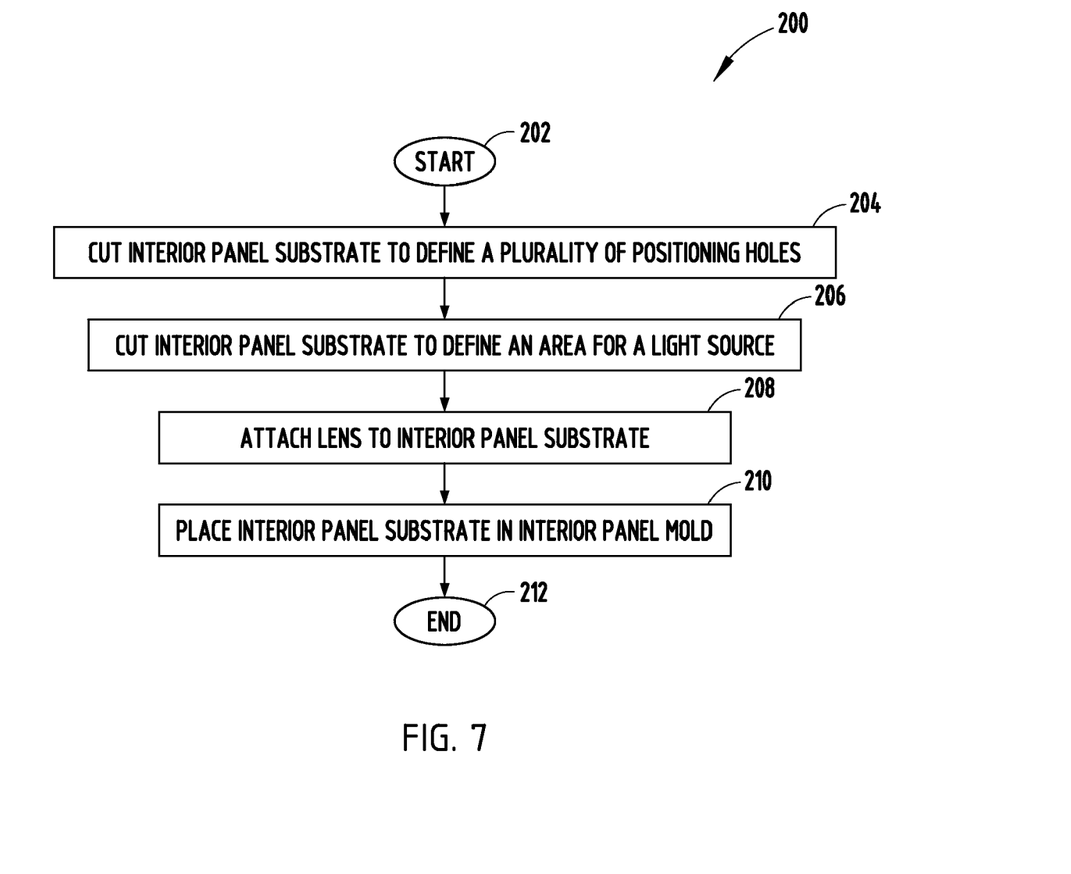
FIG. 7 is a flow chart illustrating a method of manufacturing a vehicle interior panel, in accordance with one embodiment of the present invention.

In regards to FIGS. 1-9, a method of manufacturing the vehicle interior panel 112 is generally shown in FIG. 7 at reference identifier 200. The method starts at step 202 and proceeds to step 204, wherein the interior panel substrate 114 is cut to define a plurality of positioning holes 120. At step 206, the interior panel substrate 114 is cut to define the aperture 116 for the light source 110. It should be appreciated by those skilled in the art that steps 204 and 206 can be done approximately simultaneously. The method 200 then proceeds to step 208, wherein the lens 118 is attached to the interior panel substrate 114. Typically, the lens 118 at least partially extends over the aperture 116. At step 210 the interior panel substrate 114 is placed into the interior panel mold 124, and the method 200 then ends at step 212.

Figure 8:
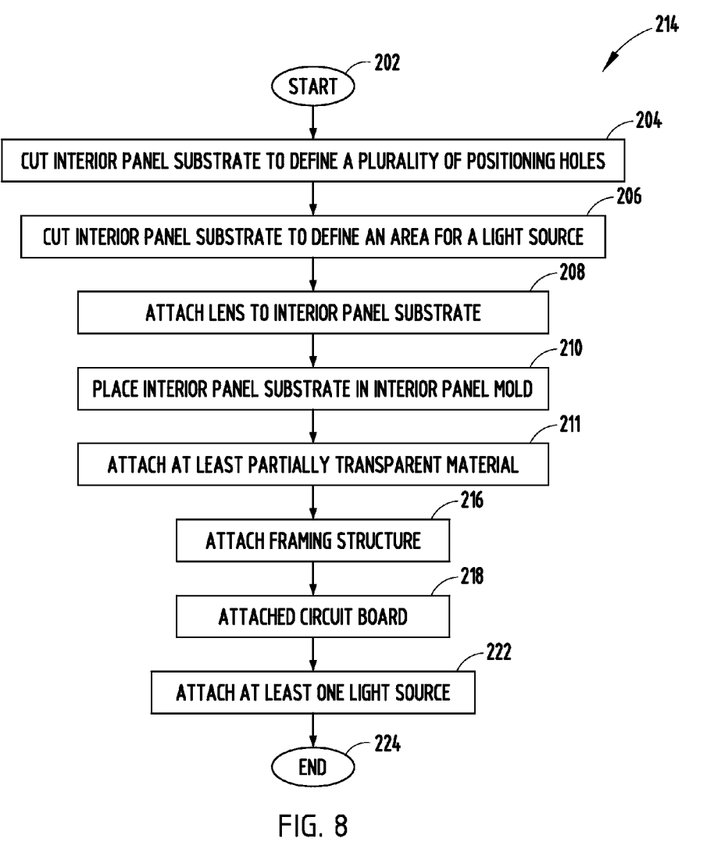
FIG. 8 is a flow chart illustrating a method of manufacturing a vehicle interior panel, in accordance with one embodiment of the present invention.

According to one embodiment, in regards to FIGS. 1-6, 8, and 9, a method of manufacturing a vehicle interior panel 112 is generally shown in FIG. 8 at reference identifier 214. The method 214 starts at step 202, and proceeds to step 204, wherein the interior panel substrate 114 is cut to define the plurality of positioning holes 120. At step 206, the interior panel substrate 114 is cut to define the aperture 116 for the light source 110. The method 200 then proceeds to step 208, wherein the lens 118 is attached to the interior panel substrate 114. Typically, the lens 118 at least partially extends over the aperture 116. At step 210 the interior panel substrate 114 is placed into the interior panel mold 124. The at least partially transparent material 108 can be attached to the interior panel substrate 114 at step 211.

The method 214 proceeds from step 210 to step 216, wherein the framing structure 130 is attached to the interior panel substrate 114. At step 218, the circuit board 104 is attached to the framing structure 130. The at least one light source 108 is attached to the circuit board 104 at step 222, and the method 214 then ends at step 224.

Advantageously, the vehicle interior panel 112 and methods 200, 214 reduce manufacturing steps by cutting the positioning holes 120 and the aperture 116 at the same manufacturing step and attaching the lens 118 to the interior panel substrate 114 prior to molding, and accurately places the interior panel substrate into the interior panel mold 124 by utilizing at least a portion of the positioning holes 120 that correspond to the positioning pins 122. Thus, the number of manufacturing steps is reduced, and the molded interior panel 112 has an aesthetically pleasing finish. It should be appreciated by those skilled in the art that additional or alternative advantages may be present from the vehicle interior panel 112 and the methods 200, 214. It should further be appreciated by those skilled in the art that the above-described components described herein can be combined in additional or alternative ways not explicitly described herein.

It is to be understood that variations and modifications can be made on the aforementioned structure without departing from the concepts of the present invention, and further it is to be understood that such concepts are intended to be covered by the following claims unless these claims by their language expressly state otherwise.

We claim:
1. A method of manufacturing a vehicle interior panel, said method comprising the steps of:
provided a plurality of positioning pins on an interior panel mold;
cutting an interior panel substrate to define a plurality of positioning holes;
cutting said interior panel substrate to define an aperture for a light source to extend through said interior panel substrate;
attaching a lens to said interior panel substrate, wherein said lens extends over at least a portion of said aperture for said light source;

placing said interior panel substrate in said interior panel mold, such that at least a portion of said plurality of positioning holes correspond to said plurality of positioning pins and performing a step of modeling to form the interior panel.

2. The method of claim 1 further comprising the step of:
cutting said interior panel substrate to define an indicator light hole adapted for an indicator light to extend there-through.

3. The method of claim 2 further comprising the step of:
attaching a framing structure to said interior panel substrate.

4. The method of claim 3 further comprising the step of:
attaching a circuit board to said framing structure.

5. The method of claim 4 further comprising the step of:
attaching an at least partially transparent material to said interior panel substrate.

6. The method of claim 5 further comprising the step of:
attaching at least one light source to said circuit board, wherein said at least one light source is configured to emit light that propagates through said at least partially transparent material.

7. The method of claim 6, wherein said at least partially transparent material is a headliner fabric.

8. The method of claim 7, wherein said at least one light source is a hidden dome lamp.

9. A method of manufacturing an interior panel having a hidden dome lamp comprising:
cutting positioning holes in a substrate;
cutting an aperture for a light source in said substrate;
attaching a lens that extends over said aperture;
placing said substrate in a mold comprising positioning pins that correspond with said positioning holes;
molding a headliner; and
attaching an at least partially transparent headliner fabric over said lens.

10. The method of claim 9 further comprising the step of:
cutting said substrate to define an indicator light hole adapted for an indicator light to extend there-through.

11. The method of claim 9 further comprising the step of:
attaching a framing structure to said substrate.

12. The method of claim 11 further comprising the steps of:
attaching a circuit board to said framing structure; and
attaching at least one light source to said circuit board, wherein said at least one light source is configured to emit light that propagates through said transparent headliner fabric.

* * * * *